: 2,794,213
Patented June 4, 1957

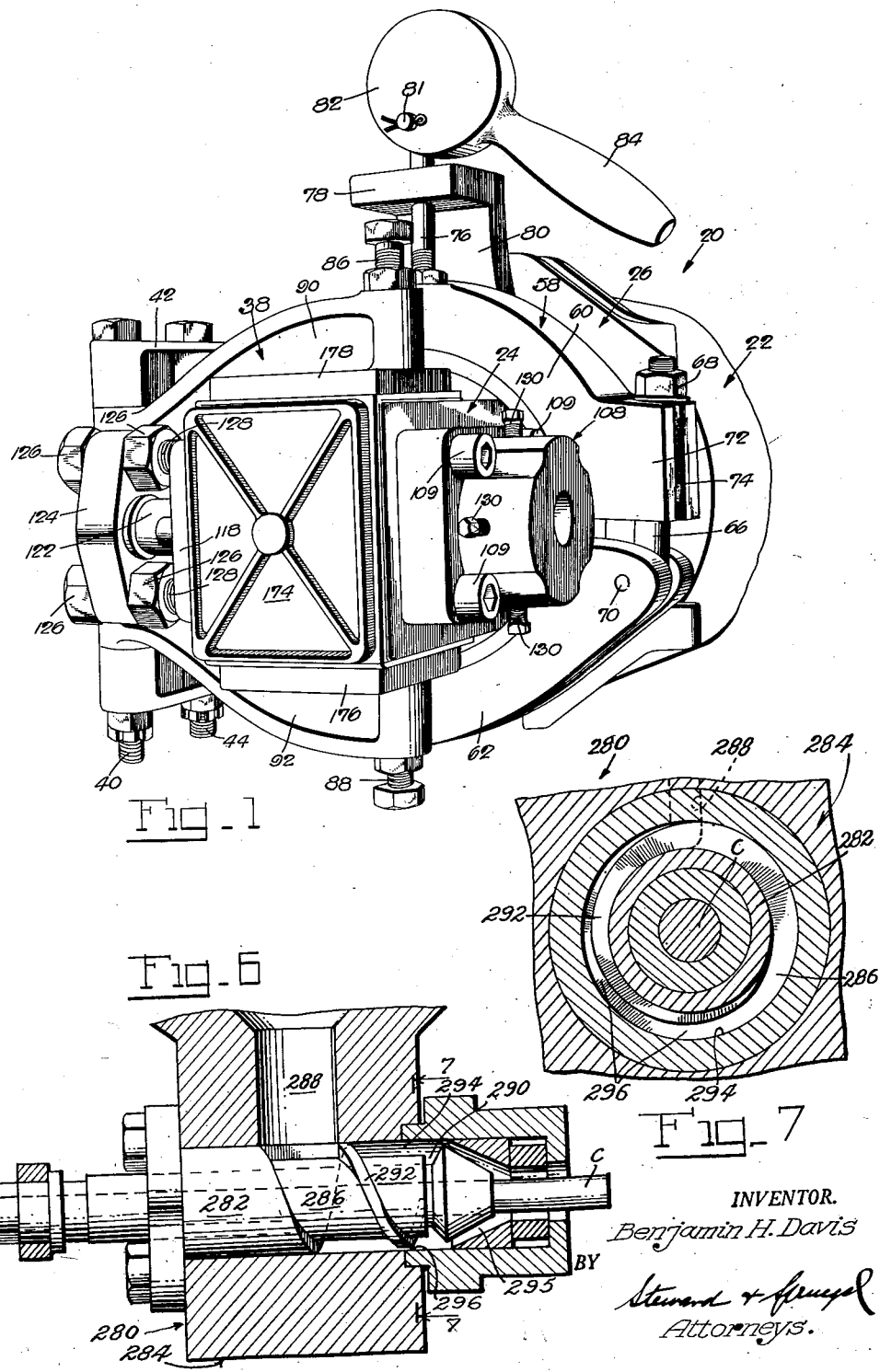

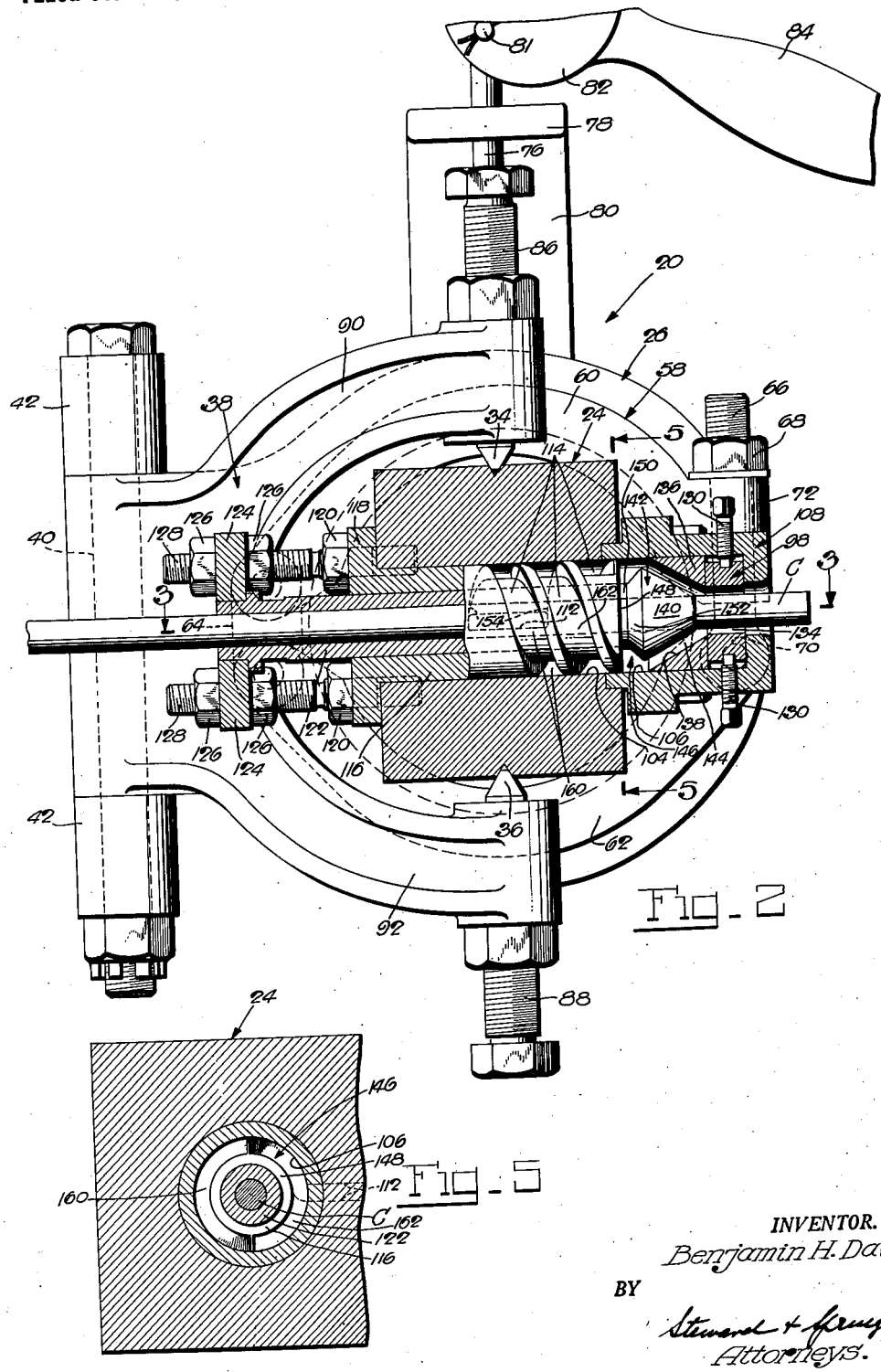

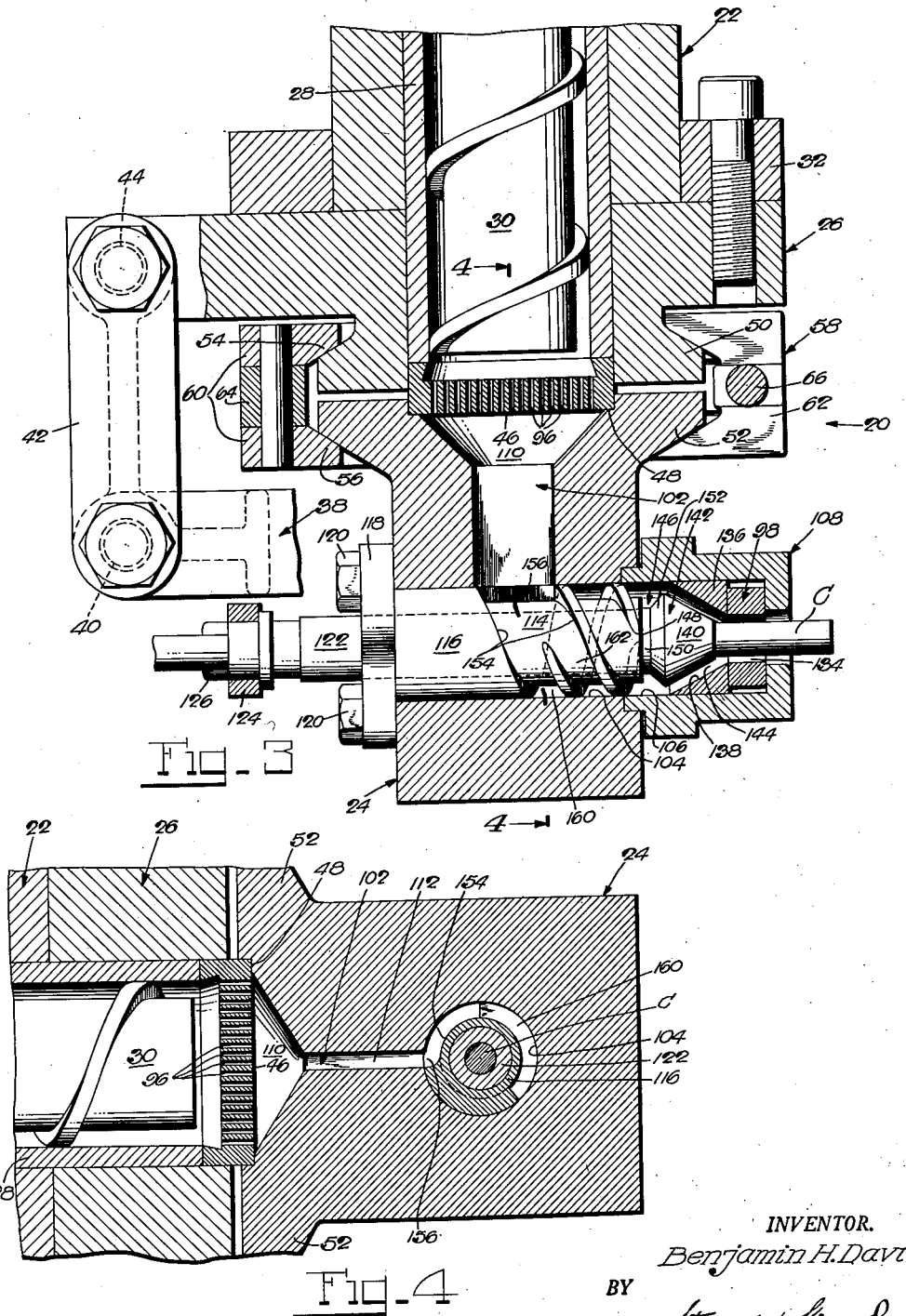

2,794,213
EXTRUSION HEAD ASSEMBLY

Benjamin H. Davis, Noank, Conn., assignor to The Standard Machinery Company, Mystic, Conn., a corporation of Connecticut Application June 14, 1954, Serial No. 436,451

6 Claims. (Cl. 18—13)

This invention relates generally to the extrusion of rubber or thermoplastics, and more particularly to apparatus for extruding a cover or jacket on a product in the course of its passage through an extrusion head.

Extrusion heads of the cross or side-delivery kind used in extrusion apparatus of this type conventionally have a core tube in which the product to-be-covered, hereinafter called "product core" or merely "core," is guided, transversely of the extrusion cylinder, toward and through the extrusion die, and an internal passage extending in part transversely of, and in part along a length of the core tube to divert or redirect the forced extrudable mass from the cylinder to the extrusion die for its application thereat to the moving core. This passage is commonly elbow-shaped to define for the extrudable mass a path which is as short as possible without being overly tortuous. However, since the branch of this passage along the coextensive length of the core tube is directed generally axially of the aligned die aperture, even the slightest variations in the flow rate of the extrudable mass cross-sectionally of this branch will inevitably result in even greater variation of the flow rate of the stock into the die aperture. Variations in the flow rate of the stock cross-sectionally of this branch of the elbow passage are considerable and stem from several uncontrollable factors. Accordingly, the elbow passage provided in prior extrusion apparatus of this type is deficient in the most important respect of delivering the extrudable mass at a uniform volumetric rate to every part of the aperture in the extrusion die, with the result that the extruded cover or jacket on the traveling product core is invariably non-uniform in wall thickness. This holds true even if recourse is had to the well-known expediency of a floating or adjustable extrusion die, for any correction in this fashion of the flow rate of the extrudable mass toward greater uniformity throughout the cross-section of the die aperture will inevitably be at the sacrifice of the uniformity of the volumetric rate of this mass therethrough. Hence, covers or jackets extruded on product cores in prior apparatus of this kind have varying wall thicknesses not only circumferentially of the cores but longitudinally thereof as well. Non-uniformity of the wall thickness of a cover or jacket thus extruded is, of course, highly objectionable, for extrudable material is wasted in that part of the cover where the wall thickness is excessive in order that the cover may at least have a minimum permissible wall thickness throughout, and this waste of extrudable material assumes prohibitive proportions where the cover or core, or both, have large cross-sectional dimensions. Further, due to the unevenness of these extruded covers circumferentially as well as longitudinally thereof, products thus covered are unsuitable for many purposes for which they would otherwise be well suited.

It is the primary aim and object of the present invention to make provisions in extrusion apparatus of this type for conducting an extrudable mass from the discharge end of the extrusion cylinder toward and along the core tube in the associated cross-type extrusion head to the extrusion die in such manner that the mass will be delivered to the die aperture throughout its cross-section at a volumetric flow rate which is so uniform as to preclude any appreciable variations in the wall thickness, both peripherally and longitudinally, of a cover extruded on a product core passing through the core tube and the die aperture, thereby not only precluding any waste of extrudable material regardless of the cross-sectional sizes of products thus covered, but also obtaining covered products which meet the most exacting requirements as to uniformity of the wall thickness of their extruded covers and, hence, making these products available for many applications for which previous products of this kind could not be used due to their unevenly extruded covers.

It is another object of the present invention to make provisions in the aforementioned extrusion head of apparatus of this type whereby the forced extrudable mass in the head is directed from the elbow passage into a delivery chamber in such fashion that the delivered stock therein will build up a back pressure which is independent of that of the stock in the elbow passage and is substantially uniform throughout the delivery chamber before proceeding into the aperture of the extrusion die, thereby to achieve a flow of the mass into the die aperture throughout its cross-section substantially at the aforementioned uniform volumetric rate which will greatly contribute toward the extrusion on a product core of a cover of uniform wall thickness throughout.

It is a further object of the present invention to make provisions in the aforementioned extrusion head for directing the stock in the elbow passage such that part of the stock will have a compound motion axially toward the aforementioned delivery chamber as well as rotary about the core tube, and the remaining part of the stock will, at least over part of its passage to the delivery chamber have motion merely axially toward the latter, thereby to achieve the aforementioned independent build-up of an even more uniform back-pressure of the mass in the delivery chamber and the ensuing flow of the mass into the die aperture at a quite uniform volumetric rate throughout.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary perspective view of the head end of extrusion apparatus embodying the present invention;

Fig. 2 is a longitudinal section through the extrusion head of the apparatus;

Fig. 3 is a fragmentary section through the apparatus substantially as taken on the line 3—3 of Fig. 2;

Fig. 4 is a fragmentary section through the apparatus as taken on the line 4—4 of Fig. 3;

Fig. 5 is a fragmentary section taken on the line 5—5 of Fig. 2;

Fig. 6 is a fragmentary section through an extrusion head embodying the present invention in a further featured manner; and Fig. 7 is an enlarged fragmentary section taken on the line 7—7 of Fig. 6.

Referring to the drawings, and more particularly to Figs. 1 to 5 thereof, the reference numeral 20 designates extrusion apparatus which comprises, in the present instance, a conventional lined cylinder jacket 22 and an extrusion head 24 of the cross or side-delivery type. The cylinder jacket 22, which may be equipped with the customary heating and/or cooling means (not shown), carries at its front end an anchor plate 26 for the extrusion head 24, and is provided with a liner or cylinder 28 in which a stock-feed screw 30 revolves. The cylinder 28 extends into the anchor plate 26, and the latter is bolted or otherwise removably mounted on a flange 32 on the cylinder jacket 22 (Fig. 3).

The extrusion head 24 is in this instance hingedly mounted on the anchor plate 26. To this end, the head 24 is swivelled on opposite pin-type bearings 34 and 36 on a yoke 38 which is pivoted at 40 to a strap 42 that is, in turn, pivoted at 44 to the anchor plate 26 (Figs. 1, 2 and 3). The head 24 is releasably clamped to the anchor plate 26 through an interposed breaker plate 46 which is seated in an annular recess 48 in the head 24 and bears against the adjacent end of the cylinder 28 (Figs. 3 and 4). To this end, the anchor plate 26 and head 24 are provided with frusto-conical flanges 50 and 52, respectively, which are forcefully drawn together by opposite frusto-conical cheeks 54 and 56 of a clamping ring 58 (Fig. 3). In the present instance, the clamping ring 58 is formed in two complementary upper and lower parts 60 and 62 which are hingedly connected through a link 64 and held in firm clamping engagement with the flanges 50 and 52 by a bolt 66 and nut 68 (Figs. 1 to 3). The bolt 66 is in this instance pivoted at 70 on the lower abrupt bend (Fig. 4) in the path of the stock between the ring part 62, while the nut 68 is tightened against a side lug 72 on the upper ring part 60 which is slotted at 74 for the reception of the bolts 66.

With this arrangement, the extrusion head 24 may expeditiously be released from the anchor plate 26 and swung outwardly for ready access to the breaker plate 46, cylinder 28 or feed screw 30 therein, by merely loosening the nut 68 and swinging the bolt 66 from the slotted lug 72 and thereupon separating the ring parts 60 and 62 from the flanges 50 and 52, as will be readily understood. After inspection, repair or replacement of any of the then accessible parts of the apparatus, the extrusion head 24 may as expeditiously be reassembled with the anchor plate 26 by swinging it in place thereon, closing the complementary parts 60 and 62 of the clamping ring 58 on the flanges 50 and 52, swinging the bolt 66 into the slotted lug 72 on the upper ring part 60 and tightening the nut 68.

To facilitate separation of the tightly clamping ring 58 from the flanges 50 and 52 for temporary disconnection of the extrusion head from the cylinder assembly, the upper ring part 60 is in this instance provided with a stud 76 which passes through an abutment 78 on an arm 80 on the anchor plate 26 and pivotally carries at 81 a cam or eccentric 82 with a convenient handle 84. Thus, after loosening the nut 68 and swinging the bolt 66 from the slotted lug 72 on the upper ring part 60, the latter may readily be broken loose from the adjacent portions of the flanges 50 and 52 by merely turning the eccentric 82 with its handle 84, counterclockwise as viewed in Fig. 1, until the same reacts with the abutment 78. Once the upper ring part 60 is thus released from the flanges 50 and 52, the lower ring part 62 will follow suit either of its own accord or on being tapped more or less lightly.

The aforementioned pin-type bearings 34 and 36 are, in the present instance, provided by screws 86 and 88, respectively, which are threadedly received in the opposite arms 90 and 92, respectively, of the yoke 38, thereby permitting ready adjustment of these bearings for correct horizontal alignment of the extrusion head 24 with the cylinder assembly.

Extrudable materials, such as natural or synthetic rubber mixes or synthetic thermo-plastics, hereinafter referred to as "stock," are introduced in a solid state into the cylinder 28 and carried forward therein toward the breaker plate 46 by the usually power-driven feed screw 30. In the course of its forced forward feed in the cylinder 28, the stock becomes heated and in consequence softens and eventually reaches the proper plastic state for extrusion. The requisite heating of the stock in the cylinder 28 is achieved by the internal and mechanical friction encountered by the stock while being worked forward by the feed screw 30, and if necessary by additional heat from the usual heating means in the cylinder jacket 22. Recourse may also be had to the usual cooling means in the cylinder jacket for close heat control over the stock. On passing through the numerous orifices 96 in the breaker plate 46, the stock enters the extrusion head 24 wherein it is directed through passages to be described to the extrusion die 98 for its application as a cover or jacket on a continuous product or product core C, such as an electric cable, for instance.

The instant extrusion head 24, being of the cross or side-delivery type for the contemplated cover extrusion on a continuous product core C, in general provides the customary elbow path for the stock for diverting the same along the usual core tube in the head toward the aligned extrusion die. This path is defined by a passage 102 which extends in line with the cylinder 28, and in part by a transverse aperture 104 in the head 24 and a continuing aperture 106 in a die carrier 108 which may be bolted at 109 on the head 24 (Fig. 1). The passage 102 is in this instance divided into a bowl-like receiving chamber 110 next to the breaker plate 46, and a continuing constricted throat 112 which leads laterally into the aperture 104 in the head 24 intermediate its ends (Figs. 3 and 4). The part of the aforementioned elbow path through the aperture 104 in the head 24 is further defined by a sleeve 116 therein in a manner to be described. The sleeve 116 has in this instance a head flange 118 bolted at 120 to the adjacent side of the head 24. Received in the sleeve 116 is the core tube 122 which is axially adjustable by having a cross-head 124 mounted by nuts 126 on rearwardly extending shanks 128 on two of the aforementioned bolts 120 (Fig. 2). Mounted in the die carrier 108, in this instance by set or adjustment screws 130, is the aforementioned extrusion die 98 having a throat or aperture 134. Also mounted in any suitable manner in the die carrier 108 is a reducing die 136 having a frusto-conical surface 138 which, together with a frusto-conical surface 140 on a nose or tip 142 on the core tube 122, define a frusto-conical or tubular lead passage 144 to the aperture 134 in the extrusion die 98. The lead passage 144 is of restricted, though substantially uniform, cross-sectional area throughout, and immediately adjoining the same and communicating therewith is a larger stock-delivery chamber 146 which is defined by the aperture 106 in the die carrier 108, the adjacent end 148 of the sleeve 116, and an exposed length 150 of the core tube 122 and a continuing frusto-conical surface 152 on the nose 142 thereon.

Stock forced by the feed screw 30 from the cylinder 28 through the orifices 96 in the breaker plate 46 into the receiving chamber 110 and then through the restricted throat 112 into the aperture 104 in the extrusion head 24, is there redirected to flow in a tubular passage 114 along the sleeve 116 into the delivery chamber 146, thence through the restricted lead passage 144 into the aperture 134 in the extrusion die 98 where the stock will be applied, in the form of a cover, to the core C as the latter is moved forwardly through the core tube 122 and into and through the aligned die aperture 134.

The tubular passage 114 for the stock along the sleeve 116 is, in the present instance, arranged helically by helically grooving the outer periphery of this sleeve. Thus, the sleeve 116 is provided with a helical groove 154 which at one end leads into the throat 112 in the head 24 as at 156 (Fig. 4), and at its other end is continued as a plurality of helical grooves, in this instance two grooves 160 and 162, which lead to the enlarged delivery chamber 146.

In thus providing for the passage of the helically advancing stock ribbons into the delivery chamber at equiangularly spaced places therein, they are compelled to build up in and throughout the delivery chamber a substantially uniform back-pressure of sufficient magnitude to overcome the succeeding impediment encountered by the stock in the form of the redirecting and restricted lead passage to the die aperture, with the result that a cover thus formed on a core traveling through the die aperture will have substantially uniform wall thickness.

To this end the delivery chamber 146 is arranged concentrically about the core tube 122 (Figs. 2, 3 and 5), and its mean cross-sectional area is larger than the combined cross-sectional areas of the helical grooves 160 and 162 or the cross-sectional area of the lead passage 144.

Conventionally, the extrusion head 24 is provided with heating means to keep the stock at proper temperature and, hence, plasticity while flowing in the extrusion head to the extrusion die. To this end, three external band heaters 174, 176 and 178 are mounted on the front, bottom and top of the head 24 (Fig. 1).

While for the sake of structural simplicity and relative axial adjustability of the sleeve 116 and core tube 122 the same are in this instance made as separate parts, it is, of course, fully within the purview of this invention to form them in a single part. It is also within the purview of the present invention to omit the peripherally grooved sleeve 116 altogether, and instead provide the helical grooves in the core tube-receiving aperture in the extrusion head, as will be readily understood.

Reference is now had to Fig. 6 which shows a further featured extrusion head assembly 280 of which the sleeve 282 in the extrusion head 284 is provided, in the present instance, with a single helical groove 286 between the throat 288 and the delivery chamber 290. The intervening rib 292 between axially adjacent portions of the helical groove 286 is of gradually diminishing height, starting at the throat 288 (see also Fig. 7), so as to leave between the rib 292 and the inner wall of the tubular passage 294 in the extrusion head a gap 296 of gradually varying width. As in the previously described extrusion head 24, the cross-sectional area of the tubular passage 294 is smaller than the mean cross-sectional area of the delivery chamber 290, and the cross-sectional area of the tubular lead passage 295 is also smaller than the mean cross-sectional area of the delivery chamber 290. With this arrangement, a part of the stock will be forced to follow the helical path of the groove 286, while the remaining part of the stock need not follow this helical path but will flow axially of the tubular passage 294 through the gap 296 and compensate the helically delivered stock at the end of the helical path at those places where the helically delivered stock would be insufficient to achieve substantially uniform stock delivery into the chamber 290 throughout its extent. The stock advances from the chamber 290 through the lead passage 295 into the adjacent die opening for the formation of a cover on a continuous product core C'.

Actual tests have shown that the present extrusion head assembly 280 achieved a most satisfactory uniform stock delivery into the chamber 290. Accordingly, a highly satisfactory control over the stock delivery rate into the chamber 290 is achieved by compelling a part of the stock in the tubular passage 294 in the extrusion head to follow a helical path and permit the remainder of the stock to flow directly axially through the tubular passage 294 so that the helically and axially flowing stock portions may compensate each other and flow into the chamber 290 at a substantially uniform volumetric rate throughout the extent of the latter.

Underlying the extrusion head assembly 280 of Fig. 6 is the basic concept of achieving most uniform stock delivery into an extrusion die throughout its aperture by arranging for helical flow of part of the stock and for axial flow of the remainder of the stock along the core tube toward the die. In so doing, the axially flowing stock may be directed to compensate the helically flowing stock before the die aperture at those places where necessary in order to achieve uniform delivery of the stock into the die aperture throughout its width.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In extrusion apparatus, the combination of a head having a longitudinal aperture and a lateral inlet thereto intermediate its ends; an extrusion die in one end of said aperture; a core tube in said aperture in line with said die and defining in said aperture a tubular communication passage between said inlet and die; and means in said tubular passage defining therein a helical path which at least in part is of less depth than said passage to permit part of the extrusion stock to flow axially of the latter.

2. In extrusion apparatus, the combination of a head having a longitudinal aperture with a peripheral wall and a lateral inlet thereto intermediate its ends; an extrusion die in one end of said aperture; and a core tube fittedly received in said aperture and extending in line with said die, said core tube having in its outer periphery a helical groove of which adjacent portions axially of said tube are spaced by a helical rib on the latter which at least in part is spaced from the adjacent wall of said aperture to permit part of the extrusion stock to flow axially of the latter, said groove leading from said inlet toward said die.

3. The combination in extrusion apparatus as set forth in claim 2, in which said rib is in engagement with the all of said aperture at said inlet and is gradually spaced increasingly from said aperture wall in its extent toward said die.

4. In extrusion apparatus, the combination of a head having a longitudinal aperture and a lateral inlet thereto intermediate its ends; an extrusion die in one end of said aperture and having an opening; a core tube in said aperture in line with said die opening and defining in said aperture first and second tubular passages and an intermediate tubular connecting chamber of which said first passage extends from said inlet toward said die and said second passage leads to said die opening, and the mean cross-sectional area of said chamber is larger than that of either of said passages; and means in said first passage defining therein a helical path which at least in part is of less depth than said first passage to permit part of the extrusion stock to flow axially of the latter.

5. In extrusion apparatus, the combination of a head having a longitudinal aperture with a peripheral wall and a lateral inlet thereto intermediate its ends; an extrusion die in one end of said aperture and having an opening; and a core tube in said aperture in line with said die opening and defining in said aperture first and second tubular passages and an intermediate tubular connecting chamber of which said first passage extends from said inlet toward said die and said second passage leads to said die opening, and the mean cross-sectional area of said chamber is larger than that of either of said passages, said core tube having on its periphery substantially over the extent of said first passage a helical rib formation which at least in part is spaced from the adjacent wall of said aperture and defines in at least part of said first passage a helical path leading from said inlet toward said chamber.

6. The combination in extrusion apparatus as set forth in claim 5, in which said rib formation is in engagement with the wall of said aperture at said inlet and is gradually spaced increasingly from said aperture wall in its extent toward said chamber.

(References on following page)

References Cited in the file of this patent
UNITED STATES PATENTS

| | | |
|---|---|---|
| 1,679,545 | Roth | Aug. 7, 1928 |
| 1,844,972 | Parkhurst | Feb. 16, 1932 |
| 2,181,987 | Beaver et al. | Dec. 5, 1939 |
| 2,469,999 | Stober | May 10, 1949 |
| 2,512,844 | Weber | June 27, 1950 |
| 2,546,629 | Brillhart | Mar. 27, 1951 |
| 2,632,204 | Murray | Mar. 24, 1953 |
| 2,693,348 | Ellermann | Nov. 2, 1954 |

FOREIGN PATENTS

| | | |
|---|---|---|
| 624,699 | Great Britain | June 15, 1949 |